(12) United States Patent
Matzen

(10) Patent No.: US 6,644,127 B1
(45) Date of Patent: Nov. 11, 2003

(54) ELECTROMAGNETIC FLOWMETER ARRANGEMENT

(75) Inventor: Steen M. Matzen, Sønderborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/548,027

(22) Filed: Apr. 12, 2000

(30) Foreign Application Priority Data

Apr. 16, 1999 (DE) .......................... 199 17 261

(51) Int. Cl.[7] .................................................. G01F 1/58
(52) U.S. Cl. ...................................................... 73/861.12
(58) Field of Search ............................. 73/861.12, 116, 73/117; 361/152–154

(56) References Cited

U.S. PATENT DOCUMENTS

| 4,676,112 A |   | 6/1987 | Uematsu |           |
|-------------|---|--------|---------|-----------|
| 4,784,000 A | * | 11/1988| Gaertner | ............ 73/861.12 |
| 5,639,970 A |   | 6/1997 | Schulz  |           |
| 6,043,660 A | * | 3/2000 | Bahr et al. | ............ 324/380 |

FOREIGN PATENT DOCUMENTS

| DE | 2743954   |   | 11/1986 |
|----|-----------|---|---------|
| GB | 2309308 A |   | 7/1997  |
| JP | 7-248240  |   | 9/1995  |
| JP | 9-126849  |   | 5/1997  |
| JP | 9-325058  |   | 12/1997 |

* cited by examiner

*Primary Examiner*—Edward Lefkowitz
*Assistant Examiner*—Charlene Dickens
(74) *Attorney, Agent, or Firm*—Barnes & Thornburg

(57) ABSTRACT

An electromagnetic flowmeter arrangement is disclosed, having a measuring tube (2), a coil arrangement (3, 4) for generating a magnetic field substantially perpendicular to the direction of flow through the measuring tube (2), an electrode arrangement (5, 6) substantially perpendicular to the direction of flow and to the magnetic field, an evaluating device and a testing device. In this connection, it is desirable to be able to carry out testing in a simple manner. For that purpose, the testing device comprises a elements (10–13) for applying voltage to the coil arrangement (3, 4) without generating a magnetic field, and an element for determining an ohmic and/or inductive and/or capacitive coupling between the coil arrangement (3, 4) and the coil evaluating device.

12 Claims, 1 Drawing Sheet

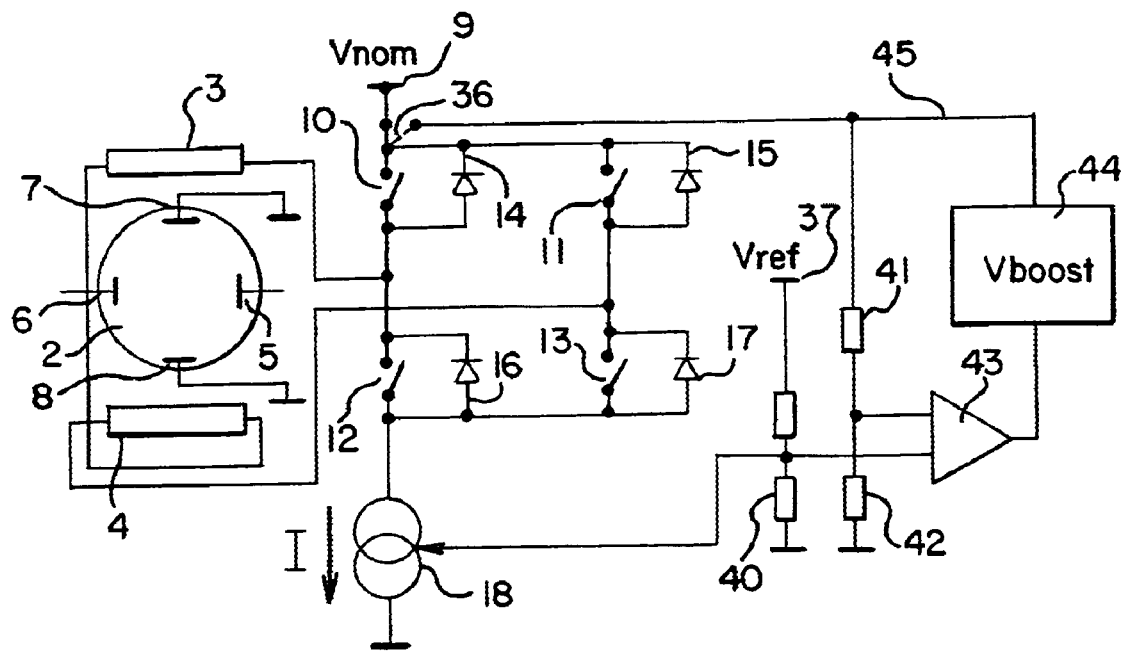
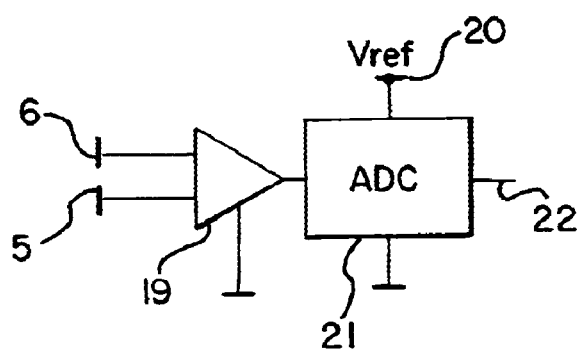

ELECTROMAGNETIC FLOWMETER ARRANGEMENT

BACKGROUND OF THE INVENTION

The invention relates to an electromagnetic flowmeter arrangement, having a measuring tube, a coil arrangement for generating a magnetic field substantially perpendicular to the direction of flow through the measuring tube, an electrode arrangement substantially perpendicular to the direction of flow and to the magnetic field, an evaluating device and a testing device.

An arrangement of that kind is known from GB 2 309 308 A. Here, to examine or test the measuring tube with its evaluating device, the normal connection between the measuring tube and its evaluating device is interrupted. Then an external measuring circuit is connected to the evaluating device and to the measuring tube. During the test, the flow through the measuring tube is not measured. The last value to be measured is retained by the evaluating device. The measuring circuit first of all determines the ohmic resistance of the coil arrangement by applying a voltage to the coil arrangement. As soon as the ohmic resistance has been determined by ratio forming, the voltage across the coil is set to zero and the exponentially decaying coil current is monitored, which then enables the inductance of the coil to be determined. The comparison between desired and actual values of ohmic resistance and inductance gives information about possible changes to the flowmeter arrangement which necessitate a re-calibration. Calibration is then carried out by using new calculation values.

The expense involved in a test is relatively high. As a consequence, there is a risk that a test will be carried out only at relatively large intervals. There is also the danger that the interruption and reconnection of leads will introduce errors, which will have an adverse effect on the actual measurement, for example, through inaccurate or false measurement values. This can become problematical in particular when the flowmeter is used to account for consumption.

SUMMARY OF THE INVENTION

The problem underlying the invention is to be able to carry out testing of the flowmeter arrangement in a simple manner.

The problem is solved in an electromagnetic flowmeter arrangement of the kind mentioned in the introduction in that the testing device comprises first means for applying voltage to the coil arrangement without generating a magnetic field, and second means for determining an ohmic and/or inductive and/or capacitive coupling between the coil arrangement and the evaluating device.

During examination (in the following also described as "testing"), electrical relationships are therefore created, which come relatively close to those in operation. To be precise, voltage is applied to the coil and signals can be taken from the electrode arrangement. Unlike normal measuring operation, these signals cannot have been generated by the magnetic field and the fluid flowing through, because precautions have been taken to ensure that no magnetic field is generated. If signals do occur, these can only be attributable to an electrical coupling between the coil arrangement and the evaluating device. If this coupling changes, then this is an indication that the flowmeter arrangement as a whole has changed, so that possibly a calibration is needed. Should this coupling not have changed, one can assume that a calibration performed originally continues to be valid. The coupling can be expressed by different physical variables. The ohmic, inductive and capacitive coupling or just one or two kinds of this coupling can be monitored. The time needed to determine this coupling is not generally very long. Testing can therefore also be carried out during normal measuring operation, which need only be interrupted very briefly for that purpose.

The second means are preferably formed by the evaluating device or are integrated therein. By means of the evaluating device the signals coming from the electrode arrangement can therefore be detected and processed in the same way as the signals determined during measuring. The evaluating device merely has to be informed that the signals present here are test signals and not measuring signals. Further processing can depend on the test signals.

The testing device advantageously comprises a timer, which initiates testing at the latest after expiry of predetermined time intervals. One is not then dependent on carrying out testing from time to time oneself or by maintenance personnel. On the contrary, testing is effected automatically at the latest at the end of predetermined time intervals. These test intervals can, of course, also be shortened.

The voltage is preferably in the form of a controlled alternating voltage. Accordingly, the coil arrangement has different voltage potentials applied to it and for the different voltage potentials the corresponding couplings can be examined. The danger that an error will remain undiscovered because it occurs only in a specific operating state of the voltage is relatively small, because all voltage levels occurring in operation are passed through.

In this connection, it is especially preferred that the voltage is formed by a supplementary voltage. Such a "boost" voltage is an increased voltage that is already present in many flowmeters to accelerate the build-up of the magnetic field. This higher voltage renders a coupling that may already be present more easily recognizable.

It is especially preferred in this connection that the voltage during testing has the same parameters as during measuring. In other words, the "boost" voltage that is present anyway can be used to carry out testing as well. During measuring and during testing the "boost" voltage then has the same amplitude and the same frequency.

The voltage is preferably generated by an H-bridge, which has in each branch a controlled switch, the H-bridge being active crosswise during measuring and sidewise during testing. During measuring, the diagonal branches of the H, in the middle of which the coil arrangement is connected, are operated in a manner known per se so that a current can flow in one or other direction through the coil arrangement. An alternating field is generated in this way in the coil arrangement. During testing, the same H-bridge can be used, the difference being merely that the bridge is no longer operated crosswise, but in each case a half of the bridge branches, namely the branches that are connected to the same voltage potential, are closed. It is therefore possible in a simply way to apply voltage to the coil arrangement without generating a magnetic field. Current flow is prevented.

The coils of the coil arrangement are preferably short-circuited during testing. Conditions in the coils of the coil arrangement are therefore the same and testing is simplified.

The short-circuited coils are advantageously connected alternately to a voltage source and to earth during testing. Leakage currents from the coil arrangement to the evaluating device and vice versa can therefore be detected.

It is also advantageous for the testing device to have a memory device in which values determined during testing and/or desired values are saved. The desired values can originate, for example, from the first or from the last valid calibration. The values ascertained during testing can then be compared with the values in memory. Variations can be used to assess whether the flowmeter arrangement is still operating sufficiently reliably or not. The memory device can also be used, however, to save one after the other a certain number of test values and as it were to record the "history" of the flowmeter arrangement. Of course, past test values can also be "compressed" and, for example, their mean value and their range of variation can be saved in memory, these variables being updated at each test and then saved again.

The testing device preferably determines a reliability coefficient from the spread of values determined during testing and repeats the tests in dependence on the reliability coefficient. In this connection, the assumption is that testing should take place more frequently when it appears that the individual values are widely spread. If, on the other hand, no great variations are discernible, then there can be a longer period of waiting to the next test. Here, an upward limit is set by means of the predetermined time intervals, which have been mentioned above.

BRIEF DESCRIPTION OF THE DRAWING

The invention is described in detail in the following with reference to a preferred exemplary embodiment and in conjunction with the drawings, in which:

the single FIGURE is a diagrammatic representation of the circuit of an electromagnetic flowmeter.

DESCRIPTION OF THE PREFERRED EMBODIMENTS

A flowmeter comprises an electrically insulated measuring tube 2 through which a liquid or a gas can flow perpendicular to the plane of the drawing. Measuring electrodes 5 and 6 are arranged perpendicular to the direction of flow. Coils 3, 4 of a coil arrangement, which are connected in series with one another, are arranged perpendicular to the direction of through-flow and perpendicular to the arrangement of the measuring electrodes 5, 6. When current flows through the coils 3, 4 they therefore generate a magnetic field which is oriented perpendicular to the direction of through-flow and perpendicular to the connection between the measuring electrodes 5, 6.

Such a flowmeter is known per se. When a fluid flows through the measuring tube 2 then between the measuring electrodes 5, 6 a voltage is generated, which is dependent on the speed of the fluid and on the strength of the magnetic field.

In addition, earth electrodes 7, 8 are arranged in the measuring tube. All the electrodes 5–8 are insulated electrically with respect to the measuring tube.

A current regulator 18 provides the control for a constant current I.

An H-bridge circuit has four switches 10–13, each of which is protected by a respective free-wheeling diode 14–17. The switches 10–13 are arranged between a voltage source 9 and the current regulator 18. The diagonal of this bridge circuit is connected to the coils 3, 4 of the coil arrangement. When the switch 10 and the switch 13 are closed, a current flows anti-clockwise (as seen in the Figure) through the coils 3, 4. When the switches 11 and 12 are closed, but the switches 10 and 13 are open, then current flows in the opposite direction.

Measurement of the flow through the measuring tube 2 is effected by means of the measuring electrodes 5, 6, which are connected to a differential amplifier 19. The output signal of the differential amplifier 19 is supplied to an analogue-to-digital converter 21, which, on the basis of a reference voltage Vref at an input 20, converts the analogue input signal into a digital signal which is passed via a terminal 22 to a digital evaluating circuit that which determines the through-flow values on the strength of the measurements. Numerical values, if desired in coded form, are available at the terminal 22. The digital evaluating circuit is expediently formed by a microprocessor.

From that point of view, the circuit corresponds to a conventional flowmeter. The switch pairs 10, 13 and 11, 12, which lie crosswise in the H-bridge, are alternately opened and closed, so that an alternating current through the coils 3, 4, and hence a magnetic alternating field in the measuring tube 2, is created. The signal obtained at the electrodes 5, 6 is dependent on the intensity of the magnetic field and on the speed of the fluid flowing through.

In normal operation, the H-bridge is supplied with the voltage Vnom. A supplementary voltage supply 44 may now also be provided, which supplies a supplementary voltage Vboost. This supplementary voltage is higher than the voltage Vnom. It is used, for example, in a period following change-over of the switch pairs, until the current I has reached a predetermined value again. The time in which the magnetic field builds up and in which no accurate measurements are possible, is therefore reduced. A switch 36 is provided for change-over.

The current regulator 18 is regulated by a reference voltage Vref that is present at a terminal 37 of a voltage divider 40. This voltage serves as reference.

In addition, the voltage, which also serves as reference for the current regulator 18, is supplied to a further operational amplifier 43, the output of which is connected to the supplementary voltage supply system 44. The other input of the operational amplifier 43 is connected to the centre tap of a voltage divider comprising two resistors 41, 42, which is arranged between the output 45 of the supplementary voltage supply system 44 and earth. The output of the operational amplifier 43 therefore regulates the supplementary voltage supply system 44, which can also be referred to as the "boost generator".

The supplementary or boost voltage has the same frequency as the normal supply voltage Vnom. Merely its amplitude is different.

For testing, the H-bridge is now used differently. The voltage source 9 continues to deliver the nominal voltage Vnom. Alternatively, the increased voltage (boost voltage) can be used for testing. The current regulator 18 too operates as before. The H-bridge, however, is no longer operated such that the switches are operated crosswise simultaneously, on the contrary, the switches in one half of the bridge that is connected to the same potential are operated simultaneously, that is, either the switches 10 and 11 are closed or the switches 12 and 13. If, for example, the switches 10, 11 are now closed, the coils 3, 4 are short-circuited and are supplied with the voltage Vnom or Vboost. The voltage is therefore present at the coils 3, 4 without a magnetic field being generated in the measuring tube. When the switches 10, 11 are opened and the switches 12,13 are closed, then the coils 3, 4 are earthed.

In both instances, any signals that are taken from the measuring electrodes 5, 6 are to be returned to a coupling that is present between the supply circuit for the coils 3, 4 and the measuring electrodes or their evaluating circuit. This coupling can be an ohmic, capacitive or inductive coupling. In a preferred construction, all three coupling options are evaluated. In some cases, however, it is sufficient for just one or two of these options to be taken into account.

The coupling also generates a numerical value, if desired a coded numerical value, at the output 22 of the analogue-to-digital converter 21. The microprocessor that is connected to the output 22 can now use this numerical value for the test.

A defect does not necessarily exist if, during testing, a potential or a potential difference is present at the electrodes 5, 6. But an error may be assumed if changes occur in the behaviour of the measuring electrodes 5, 6 during repeated tests, which can be carried out at predetermined time intervals. For example, during the first calibration or during commissioning of the flowmeter arrangement, the corresponding test values can be determined and filed or saved memory and then later compared with values that are ascertained during renewed testing.

The same circuit that is used to determine the measured values can be used to determine the test values.

The test values determined during repeated tests can now be saved and at each test the variation range of the determined values can be determined. If the variation range is too large, this is an indication that changes in the flowmeter arrangement have arisen, which either require a new calibration or necessitate a repair.

In a manner not described more specifically, the range of variation of the test values can also be used to calculate a reliability coefficient. If there is only a slight spread, this is an indication that the original or most recent calibration undertaken is still "right". In that case, the tests can be carried out less frequently. If, on the other hand, the range of variation is relatively large, then it is advisable to carry out the tests more often.

It is not necessary to change the circuit configuration for the test. All that is necessary is to use the H-bridge with the switches 10–13 in the above-described way.

The tests ensure that any unwanted signal transmission, whether in the sensor, in the incoming leads or on a circuit board, will give rise to a voltage signal that can be measured with a selective voltmeter of the electronics unit.

What is claimed is:

1. An electromagnetic flowmeter arrangement, having a measuring tube, a coil arrangement for generating a magnetic field substantially perpendicular to the direction of flow through the measuring tube, an electrode arrangement substantially perpendicular to the direction of flow and to the magnetic field, an evaluating device and a testing device, the testing device comprising first means for applying voltage to the coil arrangement without generating a magnetic field, and second means for determining at least one of an ohmic, inductive and capacitive coupling between the coil arrangement and the evaluating device.

2. An arrangement according to claim 1, in which the second means is formed by the evaluating device.

3. An arrangement according to claim 1, in which the second means is integrated in the evaluating device.

4. An arrangement according to claim 1, in which the testing device comprises a timer, which initiates a test at least by the end of predetermined time intervals.

5. An arrangement according to claim 1, in which the voltage is in the form of a controlled alternating voltage.

6. An arrangement according to claim 5, in which the voltage is formed by a supplementary voltage.

7. An arrangement according to claim 6, in which the voltage during testing has the same parameters as during measuring.

8. An arrangement according to claim 1, in which the voltage is generated by an H-bridge which has in each branch a controlled switch, the H-bridge being active crosswise during measuring and sidewise during testing.

9. An arrangement according to claim 1, in which coils of the coil arrangement are short-circuited during testing.

10. An arrangement according to claim 9, in which the short-circuited coils of the coil arrangement are connected alternately to a voltage source and to earth during testing.

11. An arrangement according to claim 1, in which the testing device has a memory device in which at least one of values determined during testing and desired values are saved.

12. An arrangement according to claim 1, in which the testing device determines a reliability coefficient from the spread of values determined during testing and repeats the tests in dependence on the reliability coefficient.

* * * * *